United States Patent
Namou et al.

(10) Patent No.: US 10,670,185 B2
(45) Date of Patent: Jun. 2, 2020

(54) CONFIGURABLE USER DETECTION SYSTEM

(71) Applicant: ILLINOIS TOOL WORKS INC., Glenview, IL (US)

(72) Inventors: Saad K. Namou, Glenview, IL (US); Brandon L. Smith, Glenview, IL (US); Charles J. Purwin, Glenview, IL (US); Christopher Bennet, Glenview, IL (US); Paolino Carnevale, Glenview, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 26 days.

(21) Appl. No.: 15/505,667

(22) PCT Filed: Sep. 16, 2015

(86) PCT No.: PCT/US2015/050353
§ 371 (c)(1),
(2) Date: Feb. 22, 2017

(87) PCT Pub. No.: WO2016/044375
PCT Pub. Date: Mar. 24, 2016

(65) Prior Publication Data
US 2017/0292650 A1    Oct. 12, 2017

Related U.S. Application Data

(60) Provisional application No. 62/052,641, filed on Sep. 19, 2014.

(51) Int. Cl.
*G06K 9/00* (2006.01)
*F16P 3/14* (2006.01)
(Continued)

(52) U.S. Cl.
CPC .............. *F16P 3/144* (2013.01); *G05B 9/02* (2013.01); *G06K 9/00771* (2013.01); *G08B 13/19602* (2013.01)

(58) Field of Classification Search
CPC .. A01D 2101/00; A01D 34/66; A01D 34/661; A01D 34/73; A01D 34/84;
(Continued)

(56) References Cited

U.S. PATENT DOCUMENTS

| | | | |
|---|---|---|---|
| 6,469,734 B1 | 10/2002 | Nichani et al. | |
| 7,505,620 B2 | 3/2009 | Braune | |
| 8,735,792 B2 * | 5/2014 | Hammes | G06K 9/2027 250/205 |

FOREIGN PATENT DOCUMENTS

| | | |
|---|---|---|
| WO | 2004/114243 | 12/2004 |
| WO | 2013/056016 | 4/2013 |

OTHER PUBLICATIONS

"Edge detection", Anonymous, Wikipedia, https://en.wikipedia.org/wiki/Edge_detection.
(Continued)

*Primary Examiner* — Charlotte M Baker
(74) *Attorney, Agent, or Firm* — McCarter & English, LLP

(57) ABSTRACT

A first embodiment of the disclosure provides a system for detection of intrusion into a working space of a material testing device wherein visual user detection system uses digital image processing and filtering in order to identify user entry into the specimen test space. The visual user detection system has built-in redundancy for safety compliance and further can be used for data entry with respect to test data setup and configuration. A second embodiment of the disclosure uses a digital camera mounted on the frame of the material testing device, oriented toward a striped pattern on the top of the front base cover. The striped pattern is (Continued)

recognized by a vision algorithm which creates virtual boundary lines within the pattern. A detected intrusion, such as by a user body part, will be detected and the material testing machine put into a safe state.

16 Claims, 2 Drawing Sheets

(51) Int. Cl.
 *G05B 9/02* (2006.01)
 *G08B 13/196* (2006.01)
(58) Field of Classification Search
 CPC ... A61B 1/00149; A61B 1/00193; A61B 1/06; A61B 2034/105; A61B 2034/2065
 USPC ............... 382/141, 103, 128, 130, 131, 132; 250/205, 221; 348/152, 164, E7.09
 See application file for complete search history.

(56) References Cited

OTHER PUBLICATIONS

International Search Report issued in PCT/US2015/050353 dated Dec. 16, 2015.

\* cited by examiner

CONFIGURABLE USER DETECTION SYSTEM

This application claims priority under 35 U.S.C. 119(e) of U.S. provisional application Ser. No. 62/052,641, filed on Sep. 19, 2014, the contents of which is hereby incorporated by reference in its entirety and for all purposes.

BACKGROUND OF THE DISCLOSURE

Field of the Disclosure

The present disclosure relates to a configurable vision system that accomplishes real time operator user tracking and keep-out zone detection for materials testing machines.

Description of the Prior Art

In the materials testing field, safety of the user or operator is a paramount concern. The environment of application of extremely high forces on the material samples entails a potential hazardous situation for the user or operator. Current systems typically approach this concern by providing mechanical devices, such as physical guards, to shield the user from inadvertently entering the test space.

However, the prior art does not offer active safety systems to protect the user.

SUMMARY OF THE DISCLOSURE

It is therefore an object of the present disclosure to provide an active vision system in the material testing field in order to protect the user from the specimen test space.

This and other objects are attained in a first embodiment by providing a system for detection of intrusion into a working space of a material testing device wherein visual user detection system uses digital image processing and filtering in order to identify user entry into the specimen test space. The visual user detection system has built-in redundancy for safety compliance and further can be used for data entry with respect to test data setup and configuration.

A second embodiment of the disclosure uses a digital camera mounted on the frame of the material testing device, oriented toward a striped pattern on the top of the front base cover. The striped pattern is recognized by a vision algorithm which creates virtual boundary lines within the pattern. A detected intrusion, such as by a user body part, will be detected and the material testing machine put into a safe state.

BRIEF DESCRIPTION OF THE DRAWINGS

Further objects and advantages of the disclosure will become apparent from the following description and from the accompanying drawings, wherein.

DETAILED DESCRIPTION OF THE PREFERRED EMBODIMENT

Figure 1:
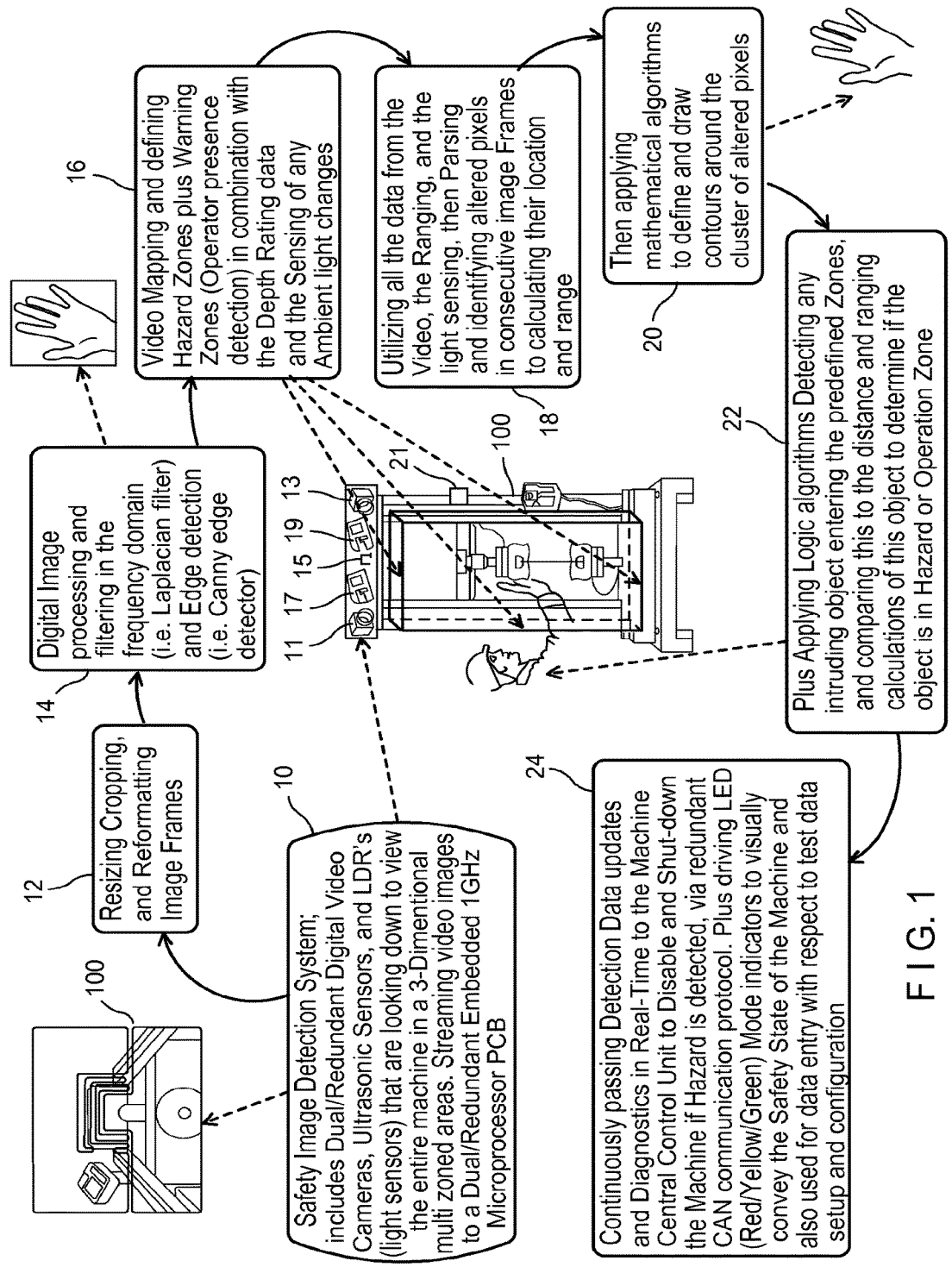
FIG. 1 is a block diagram of a first embodiment of the present disclosure.

Referring to the drawings in detail wherein like numerals indicate like elements throughout the several views, one sees that FIG. 1 is a block diagram of a first embodiment of the present disclosure.

Block 10 of FIG. 1 is a safety image detection system which includes dual/redundant digital video cameras 11, 13, ultrasonic sensors 15, and LDR's (light sensors) 17, 19 that are typically directed downwardly to view the material testing machine 100 in a 3-dimensional multi-zoned area. The dual/redundant digital video camera 11, 13 of the safety protection system stream video images to a microprocessor, such as, but not limited to, a Dual/Redundant Embedded 1 GHz Microprocessor PCB.

Block 12 of FIG. 1 illustrates that the microprocessor and associated hardware performs resizing, cropping, and reformatting of the image frames to provide information from the area of interest, which is typically the work area of the material testing machine 100.

Similarly, block 14 of FIG. 1 illustrates that the microprocessor and associated hardware performs digital image processing and filtering in the frequency domain (i.e. Laplacian filter) and edge detection (such as a canny edge detector).

Further, block 16 of FIG. 1 illustrates that the microprocessor and associated hardware performs video mapping and defines hazard zones and warning zones (that is, operator presence detection) in combination with the depth ranging data and the sensing of any ambient light changes.

Block 18 of FIG. 1 illustrates that the microprocessor and associated hardware utilizes the data from the video function, the ranging function, and the light sensing function, in order to parse the data and identify the altered pixels in consecutive image frames to calculate their location and range.

Block 20 of FIG. 1 illustrates that the microprocessor and associated hardware applies mathematical algorithms to define and draw contours around the cluster of altered pixels.

Block 22 of FIG. 1 illustrates that the microprocessor and associated hardware applies logic algorithms to detect any intruding object entering the predefined zones (such as, but not limited to, a body part entering the hazard or operator zone), and compares this to the distance and ranging calculations of this object to determine if the object is in the hazard or operator zone.

Block 24 of FIG. 1 illustrates that the microprocessor and associated hardware continuously passes detection data updates and diagnostics in real-time to the machine central control unit to disable and shut-down the materials testing machine 100 if a hazard is detected, via redundant CAN communication protocol. Block 24 additionally drives LED (Red/Yellow/Green) mode indicators to visually convey the safety state of the materials testing machine and also used for data entry with respect to test data setup and configuration.

Figure 2:
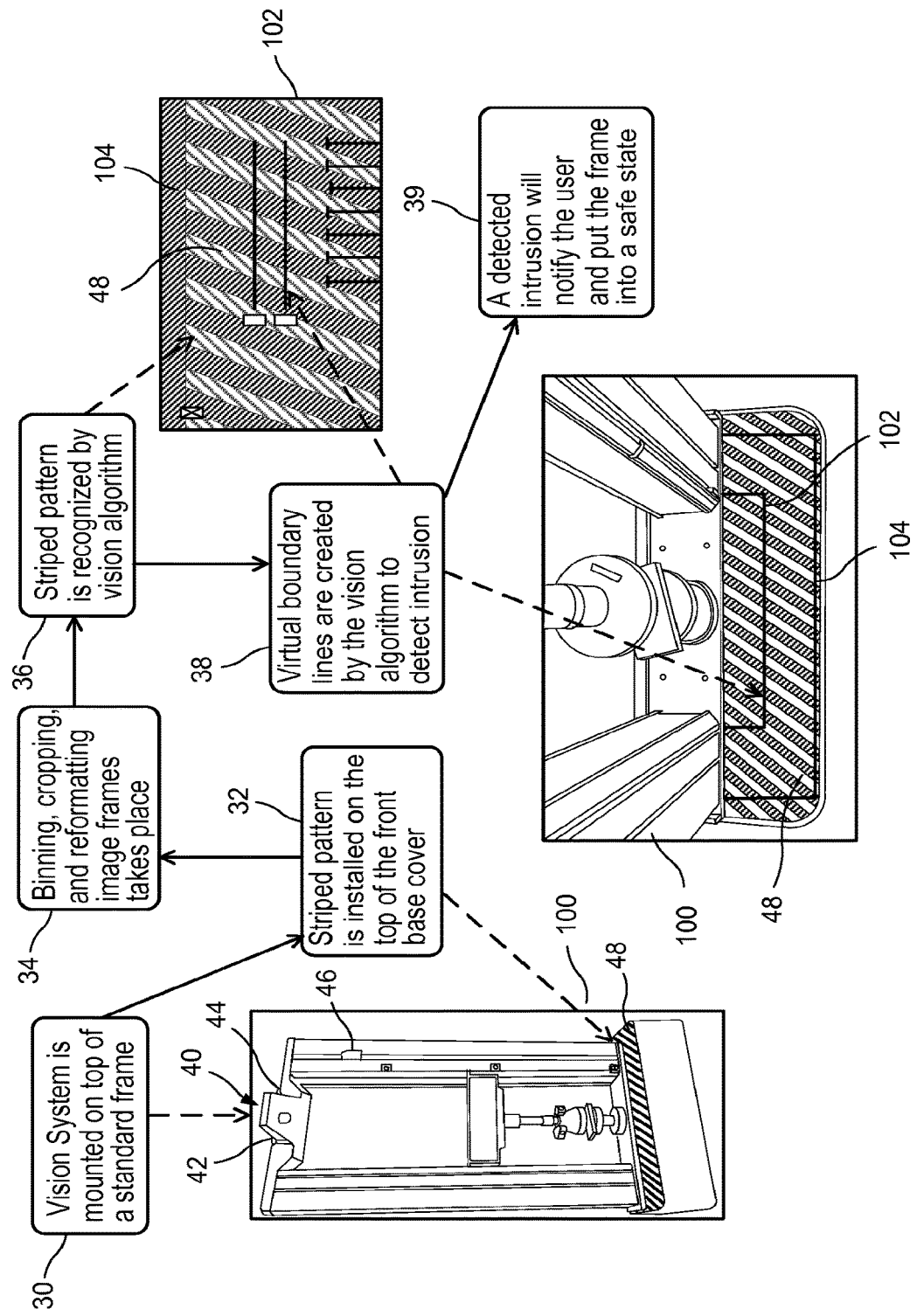
FIG. 2 is a block diagram of a second embodiment of the present disclosure.

Referring now to FIG. 2 with respect to the second embodiment of the disclosure, as described in block 30, one sees that the vision system 40 is mounted on top of a frame of a standard material testing machine 100. Vision system 40 includes a digital camera 42, an infrared lighting system 44, and a safety rated microcontroller 46 which receives streamed images from the digital camera 42 (block 46 may further include a visual display). Digital camera 42 is pointed downwardly so as be focused on upwardly facing striped target test pattern area 48 which is installed on the front base cover 102 (pointing upwardly) of the material testing machine 100, as described in block 32. In this configuration, the field of view of the digital camera 42 includes the human operator's workspace with respect to the material testing machine 100. It is envisioned that various patterns could be used in target test pattern area 48, but the striped pattern is particularly well-suited to this application.

As described in block 34, the microprocessor 46 receives the digital video image and bins, crops, and reformats the image frames. As described in block 36, the striped pattern is recognized by a visual algorithm in the microcontroller 46 and the edges of the striped target test pattern area 48 are identified to define a reference. If the target test pattern area 48 is not recognized by the visual algorithm (which may be due to, among other things, a visual obstruction, misalignment of the digital camera or malfunctioning of the system), the system cannot the initialized and the user is notified. It is within the abilities of a person skilled in the art, after review of this disclosure, to create a visual algorithm to recognize the striped pattern of target test pattern area 48, and to perform the related described functions.

As described in block 38, the visual algorithm creates virtual boundary lines 104. When these virtual boundary lines 104 are crossed, the image of the striped target pattern is skewed and the algorithm sets a flag for operation in a safe state. As described in block 40, when the flag is set by the visual algorithm in response to a detected intrusion, a CAN message is sent to put the frame of the material testing machine 100 into a safe state. That is, any detected intrusion into the space defined by the virtual boundary lines 104 will notify the user by visual and/or audio cues and put the frame of the material testing machine 100 into a safe state. By way of non-limiting example, if a user's hand or other body part extends into the space defined by the virtual boundary lines 104, the frame of the material testing machine 100 will become inoperative to the extent that no operations or functions will damage the user's hand or other body part.

Thus the several aforementioned objects and advantages are most effectively attained. Although preferred embodiments of the invention have been disclosed and described in detail herein, it should be understood that this invention is in no sense limited thereby.

What is claimed is:

1. A system for detecting intrusion into a working area of a materials testing device, comprising:
    an imaging device which creates image data of the working area of the materials testing device;
    a light sensing device which detects ambient light changes in the working area of the materials testing machine and creates ambient light data;
    a processing device which receives the image data and the ambient light data, chooses selected portions of the image data, filters the selected portions of the image data, and maps hazard zones within the filtered selected portions of the image data;
    the device resizes, crops and reformats image frames while choosing selected portions of the image data;
    the processing device further generates data regarding altered pixels from sequential image data to determine if the working area of the materials testing device has been intruded; and
    the processing device, upon detecting that the working area of the materials testing device has been intruded, puts the materials testing device into a safe state.

2. The system of claim 1 wherein the processing device, in mapping hazard zones, further processes depth ranging data from the image data of the working area.

3. The system of claim 1 further including visual indicators which operate when the materials testing device is put into a safe state.

4. The system of claim 1 wherein the step of filtering the selected portions of the image data includes Laplacian filtering and canny edge detecting.

5. A method for detecting intrusion into a working area of a materials testing device, including the steps of:
    creating image data of the working area of the materials testing device;
    detecting ambient light changes in the working area of the materials testing machine and creating ambient light data;
    providing a processing device which receives the image data and the ambient light data, chooses selected portions of the image data, filters the selected portions of the image data, and maps hazard zones within the filtered selected portions of the image data, the processing device further resizes, crops and reformats image frames of image data while choosing selected portions of image data;
    generating data regarding altered pixels from sequential image data to determine if the working area of the materials testing device has been intruded; and
    upon detecting that the working area of the materials testing device has been intruded, putting the materials testing device into a safe state.

6. The method of claim 5 further including the step of operating a visual indicator when the materials testing device is put into a safe state.

7. The method of claim 5 wherein the step of mapping the hazard zones further includes the step of processing depth ranging data from the image data of the working area.

8. The method of claim 5 wherein the step of filtering the selected portions of the image data includes Laplacian filtering and canny edge detecting.

9. A system for detecting intrusion into a working area of a materials testing device, comprising:
    an imaging device which creates image data of the working area of the materials testing device, the imaging device oriented toward an area of the materials testing device including a target test pattern;
    a processing device which receives the image data, choosing selected portions of the image data, and maps hazard zones within the filtered selected portions of the image data;
    the processing device further generating data regarding virtual visual boundary lines within the working area of the materials testing device and determining if an intrusion has entered the area defined by the visual boundary lines of the working area of the materials testing device; and
    the processing device, upon detecting that the working area of the materials testing device has been intruded, puts the materials testing device into a safe state.

10. The system of claim 9 wherein the target test pattern is a striped target test pattern.

11. The system of claim 10 wherein the striped target test pattern is placed on a top of a front base cover of the materials testing device.

12. The system of claim 9 further including visual indicators which operate when the materials testing device is put into a safe state.

13. A method for detecting intrusion into a working area of a materials testing device, including the steps of:
    creating image data of the working area, including a target test pattern, of the materials testing device;
    providing a processing device which receives the image data, chooses selected portions of the image data, and maps hazard zones within the filtered selected portions of the image data;
    the processing device further performs the steps of generating data regarding virtual visual boundary lines within the working area of the materials testing device and determining if an intrusion has entered the area defined by the visual boundary lines of the working area of the materials testing device; and upon detecting that the working area of the materials testing device has been intruded, putting the materials testing device into a safe state.

14. The method of claim 13 wherein the target test pattern is striped.

15. The method of claim 14 further including the step of placing the striped target test pattern on a top of a front base cover of the materials testing device.

16. The method of claim 13 further including the step of operating a visual indicator when the materials testing device is put into a safe state.

* * * * *